United States Patent [19]

Yao

[11] Patent Number: 4,595,993
[45] Date of Patent: Jun. 17, 1986

[54] MANUALLY RECIPROCATIVE SECTION OF AN ELECTRONIC APPARATUS

[75] Inventor: Keiji Yao, Yamatokoriyama, Japan

[73] Assignee: Sharp Kabushiki Kaisha, Osaka, Japan

[21] Appl. No.: 495,162

[22] Filed: May 17, 1983

[30] Foreign Application Priority Data

May 20, 1982 [JP] Japan .................................. 57-86297

[51] Int. Cl.⁴ .......................... G06F 1/00; G21H 1/00; H05K 7/16
[52] U.S. Cl. .................................... 364/708; 312/333; 361/391
[58] Field of Search ................ 364/708, 709; 361/391; 235/22; 400/682; 312/333, 222, 319, 15; 292/DIG. 72

[56] References Cited

U.S. PATENT DOCUMENTS

| | | | |
|---|---|---|---|
| 3,732,965 | 5/1973 | Mero | 400/682 |
| 3,760,171 | 9/1973 | Wang et al. | 364/709 |
| 3,855,432 | 12/1974 | Kelly et al. | 235/22 X |
| 3,918,752 | 11/1975 | Leone et al. | 312/333 X |
| 4,086,655 | 4/1978 | Tanimoto et al. | 364/709 X |
| 4,117,542 | 9/1978 | Klavsner et al. | 364/709 X |
| 4,159,153 | 6/1979 | Yoshikawa | 312/333 |

*Primary Examiner*—David H. Malzahn
*Attorney, Agent, or Firm*—Birch, Stewart, Kolasch & Birch

[57] ABSTRACT

A manually reciprocative section of an electronic apparatus including a programmable calculator comprises a spring, a lock element, and a lock release element. The reciprocative section is drawn out of and enclosed into the housing of the electronic apparatus. The spring shows a maximum stroke when the reciprocative section is fully enclosed within the housing and a minimum stroke when the reciprocative section is fully drawn out of the housing. The reciprocative section carries a keyboard etc. to store it when it is in no use. The lock means comprises a lock lever secured on the housing of the apparatus, and a cavity for capturing and releasing the lock lever in response to the movement of the reciprocative section.

4 Claims, 7 Drawing Figures

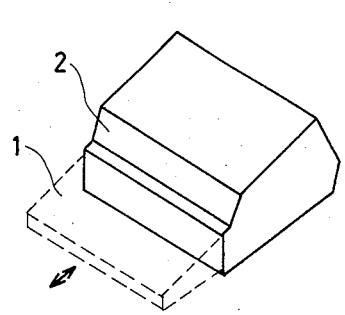
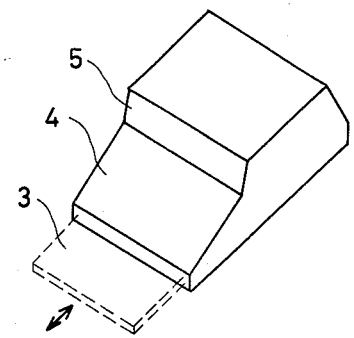
FIG.1(A)  FIG.1(B)
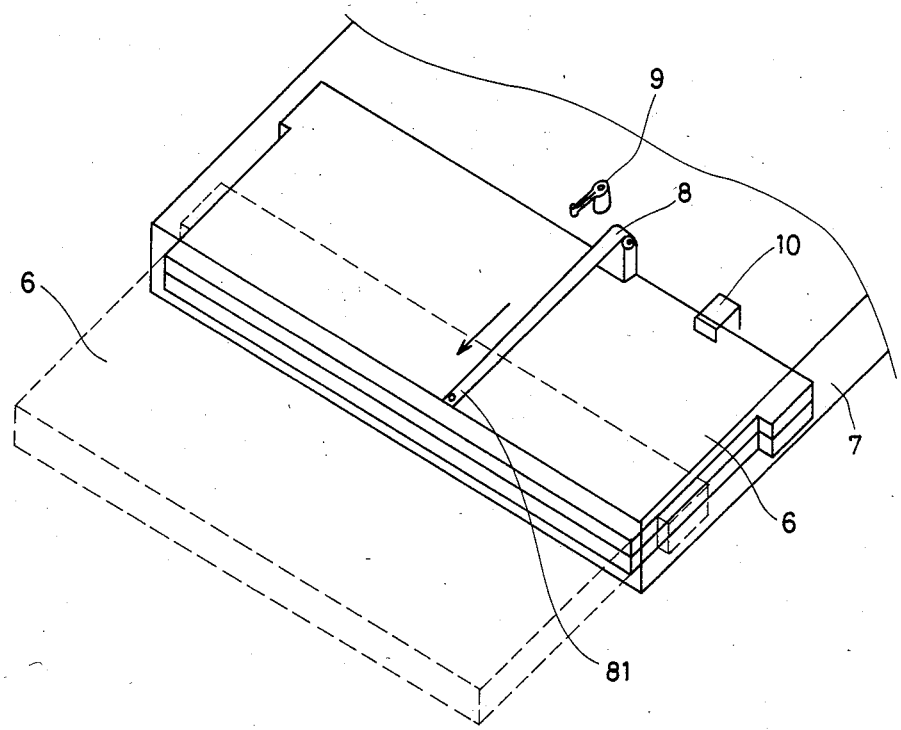
FIG.2

MANUALLY RECIPROCATIVE SECTION OF AN ELECTRONIC APPARATUS

BACKGROUND OF THE INVENTION

The present invention relates to the structure of an electronic apparatus and, more particularly, to a manually reciprocative section of an electronic apparatus.

Conventional electronic apparatuses require keyboards containing many key switches. Some key switches in these keyboards are not frequently operated, so that the continuous appearance of these keyboards containing some key switches which are not frequently used becomes a bar to operating the electronic apparatuses.

Therefore, it is desired to provide an improved keyboard arrangement for electronic apparatuses to eliminate continuous appearance of the keyboards which are not frequently used.

SUMMARY OF THE INVENTION

Accordingly, it is an object of the present invention to provide a novel reciprocative section of an electronic apparatus.

It is another object of the present invention to provide an improved keyboard of an electronic apparatus, the keyboard being reciprocative out of and into the housing of the electronic apparatus.

It is a further object of the present invention to provide an improved keyboard of an electronic apparatus, the keyboard being reciprocative out of and into the housing of the electronic apparatus with a continuous smooth slide of the keyboard.

Briefly described, in accordance with the present invention, a section, such as a keyboard, of an electronic apparatus is manually reciprocated out of and into the housing of the electronic apparatus. The keyboard is driven with a spring means. The spring means is featured by loading the keyboard with a continuous load to slowly and smoothly reciprocate the section even when the stroke, namely, the expansion of the spring means is varied. The spring means is fixed between the housing of the electronic apparatus and the section. The spring means becomes a maximum stroke at the condition that the section is fully enclosed into the housing of the apparatus and a minimun stroke at the condition that the section is fully drawn out of the housing. Lock means is provided for locking the motion of the section when the section is fully enclosed within the housing. Release means is provided for releasing the lock of the section. Preferably, the electronic apparatus is a calculator, typically, a programmable calculator. The reciprocating section as a keyboard contains one or more key switches such as a program key, a slide switch etc., which are not frequently operated.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1(A), 1(B), and 2 show perspective views of an electronic apparatus equipped with a keyboard-reciprocating system according to the present invention;

DESCRIPTION OF THE INVENTION

Figure 3:
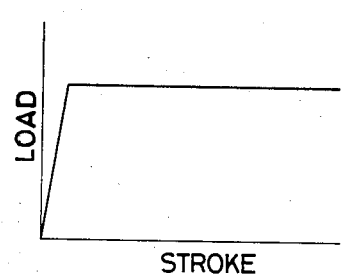
FIG. 3 shows a graph representative of the characteristics of the spring means used for the keyboard-reciprocating system of the present invention.

FIGS. 1(A) and 1(B) show perspective views of an electronic apparatus equipped with a keyboard-reciprocating system according to the present invention. Preferably, the electronic apparatus is a calculator, typically, a programmable calculator.

With reference to FIG. 1(A), the electronic apparatus comprises a manually reciprocative keyboard 1 and a display 2. The reciprocative keyboard 1 contains all the key switches required for the electronic apparatus.

With reference to FIG. 1(B), the electronic apparatus comprises a manually reciprocative keyboard 3, a fixed keyboard 4, and a display 5. The reciprocative keyboard 3 contains some key switches which are not frequently actuated for operating the electronic apparatus. These key switches are a program key, a slide switch etc. The program key is actuated to program in the electronic apparatus. The slide switch is actuated to select a mode for the electronic apparatus. The fixed keyboard 4 contains some key switches which are frequently actuated for operating the electronic apparatus, including ten digit keys, and some arithmetic function keys.

FIG. 2 shows a perspective view of a manually reciprocative system adapted for the reciproctive keyboards 1 and 3.

The reciprocative system comprises a slidable keyboard 6, a spring 8, a lock lever 9, and a transport lock lever 10. The slidable keyboard 6 carries some key switches. The spring 8 is featured by providing a continuous load even when the stroke, namely, the expansion of the spring body as shown in the graph of FIG. 3. Therefore, the slidable keyboard 6 can be reciprocated slowly and smooth. The spring 8 forces the slidable keyboard 6 to continuously be drawn out of the housing of the electronic apparatus. An end of the spring 8 is fixed to a rear end of the slidable keyboard 6. The other end 81 of the spring 8 is connected to a cabinet or housing 7 of the electronic apparatus. The slidable keyboard 6 is fully drawn out of the housing as represented in dotted lines.

The spring 8 shows a maximum stroke when the slidable keyboard 6 is fully enclosed within the housing of the electronic apparatus, and a minimum stroke when the slidable keyboard 6 is fully drawn out of the housing.

The lock lever 9 is provided for locking the slidable keyboard 6, so as not to draw it out of the housing. The lock lever 9 is used when the slidable keyboard 6 is fully enclosed within the housing. The lock lever 9 is rotatably secured in the cabinet 7.

The transport lock lever 10 is used to absolutely lock the slidable keyboard 6 during the transport of the electronic apparatus. It may be possible to use the transport lock lever 10 during the removal of the electronic apparatus.

Figure 4:
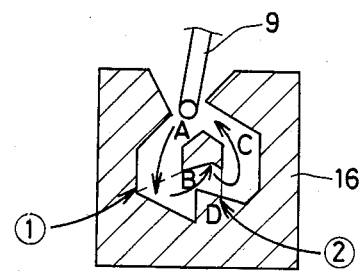
FIGS. 4, 5(A), and 5(B) show sectional views of the keyboard-reciprocating system of the present invention.

FIG. 4 shows a sectional view of an engagement unit 16. The engagement unit 16 is positioned below a back surface of the slidable keyboard 6 at the rear side thereof.

When the slidable keyboard 6 is being manually pushed into the cabinet 7, the lock lever 9 runs along a surface A of the engagement unit 16 until a step 1 in the engagement unit 16 is encountered. Because of the slope of surface A, it is not possible for the lever 9 to run along a surface C. After the lever 9 encounters step 1, it runs toward a surface B to lock the slidable keyboard 6 when the slidable keyboard 6 has been fully enclosed within the cabinet 7 at the innermost storage position. After the slidable keyboard has been locked in place by the engagement of lever 9 with surface B, when the enclosed slidable keyboard 6 is further pushed toward the housing of the electronic apparatus manually, the lever 9 is positioned on a step 2 with the help of the slope of a surface D. Because of the slope of surface D, it is not possible for the lever 9 to be positioned on the surface A. Thus, the lock lever 9 no longer is held by the engagement unit 16 and the slidable keyboard 6 is no longer locked within the housing.

After the release of the lock condition, the slidable keyboard 6 is moved continously, slowly and smoothly with the help of the biasing of the spring 8 until the outermost position is reached.

Figure 5A:
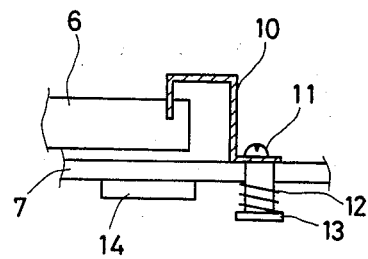
Figure 5B:
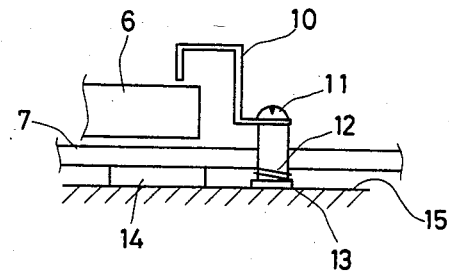

FIGS. 5(A) and 5(B) show sectional views of the transport lock lever 10 for locking the slidable keyboard 6 during the transport and the removal.

With reference to FIG. 5(A), a screw 11, a spring 12, a knob 13, and a rubber base 14 are provided in connection with the slidable keyboard 6. When the electronic apparatus is transported or removed, the base of the apparatus and the knob 13 are separated from a desk surface. The top of the screw 11 becomes adjacent the surface of the cabinet 7 by expanding the length of the screw cylinder below the cabinet 7 with the force of the spring 13, so that the tranport lock lever 10 is fastened between the screw 11 and the cabinet 7. Therefore, the transport lock lever 10 is hung on the slidable keyboard 6 by fastening the lock lever 10, so that the slidable keyboard 6 is locked as shown in FIG. 5(A).

With reference to FIG. 5(B), when the electronic apparatus is positioned on a desk 15 after the transport or removal, the spring 13 is compressed between the desk 15 and cabinet 7 on account of the weight of the electronic apparatus. The top of the screw 11 is separated from the cabinet 7. Then, the lock of the lever 10 to the slidable keyboard 6 is released.

It is unnecessary to limit the reciprocative section solely to a keyboard. The reciprocative section can be applied to any other part of the apparatus such as a display.

While only certain embodiments of the present invention have been described, it will be apparent to those skilled in the art that various changes and modifications may be made therein without departing from the spirit and scope the present invention as claimed.

What is claimed is:

1. An electronic apparatus comprising
   a housing,
   a reciprocative section mounted in said housing for reciprocating movement into and out of said housing,
   spring means for continuously urging said reciprocative section in a first direction,
   lock means for locking said reciprocative section to said housing,
   said lock means comprises a lock lever secured to said housing and an engagement unit secured to said reciprocative section,
   a cavity located in said engagement unit, said cavity having an opening for receiving said lock lever and surface means for engagement with said lock lever,
   a projection having first, second, third and fourth sides positioned in said cavity surface and means on said sides for engagement with said lock lever and for holding said lock lever in place.

2. An electronic apparatus as set forth in claim 1, wherein said projection first side has two surfaces at an angle to each other forming an intersection facing said cavity opening,
   said intersection being located to one side of said cavity opening so that said lock lever is directed around said second side of said projection upon entering said cavity opening.

3. An electronic apparatus as set forth in claim 2, wherein
   said cavity has a back wall,
   said projection third side has two surfaces intersecting at an angle to each other facing said cavity back wall,
   and said third side intersecting surfaces holding said lock lever in place in the absence of movement of said reciprocative section in a second direction opposite to said first direction.

4. An electronic apparatus as set forth in claim 3, wherein
   said cavity back wall includes a plurality of surfaces,
   one said back wall surface directs said lock lever to said third side intersecting surfaces,
   another said back wall surface positions said lock lever so that it is directed around said fourth side of said projection when there is movement of said reciprocative section in said second direction.

* * * * *